United States Patent [19]

Dickerson

[11] Patent Number: 4,923,545

[45] Date of Patent: May 8, 1990

[54] METHOD OF INSETTING PREDESIGNED DISBOND AREAS INTO COMPOSITE LAMINATES

[75] Inventor: George E. Dickerson, Yorktown, Va.

[73] Assignee: The United States of America as represented by the Administrator of the National Aeronautics and Space Administration, Washington, D.C.

[21] Appl. No.: 248,018

[22] Filed: Sep. 23, 1988

[51] Int. Cl.$^5$ .................. B32B 31/06; B32B 31/18
[52] U.S. Cl. ................... 156/153; 156/249; 156/289; 156/344; 427/272; 427/282; 427/290; 428/40
[58] Field of Search ............ 156/153, 249, 281, 289, 156/307.5, 344; 427/272, 275, 282, 290; 428/40

[56] References Cited

U.S. PATENT DOCUMENTS

| | | | |
|---|---|---|---|
| 3,193,424 | 7/1965 | Scott | 156/73.6 |
| 3,996,089 | 12/1976 | More et al. | 156/235 |
| 4,133,919 | 1/1979 | Parsons | 427/272 X |
| 4,345,959 | 8/1982 | Asai et al. | 156/289 X |
| 4,702,786 | 10/1987 | Tollman | 156/289 X |
| 4,762,680 | 8/1988 | Pennance et al. | 428/40 |

Primary Examiner—Robert A. Dawson
Assistant Examiner—James J. Engel, Jr.
Attorney, Agent, or Firm—George F. Helfrich; John R. Manning; Charles E. B. Glenn

[57] ABSTRACT

This invention is a process for producing composite laminates containing interlaminar disbonds of controlled sizes, shapes, and positions within a composite structure. A composite layer is provided for later inclusion within a laminate. The surfaces of this composite layer are solvent cleaned and sandblasted, except in desired disbond areas, which are coated with a releasing surface. A template to mask the bond areas is employed to obtain disbond areas of controlled shapes and sizes. The resulting composite layer is then used in the subsequent manufacture of a laminate, whereby faulty adhesion in the laminate can be studied with prior knowledge of the size, shape, and location of the disbond areas.

1 Claim, No Drawings

METHOD OF INSETTING PREDESIGNED DISBOND AREAS INTO COMPOSITE LAMINATES

ORIGIN OF THE INVENTION

The invention described herein was made by an employee of the U.S. Government and may be manufactured and used by or for the Government for governmental purposes without payment of any royalties thereon or therefor.

BACKGROUND OF THE INVENTION

This invention relates to laminate testing and, more particularly, to a method of producing composite laminates containing interlaminar disbonds of controlled sizes, shapes and positions within a composite structure.

The development of composite laminates with controlled, designed-in flaws is essential for modelling impact damage. In the past, disbonds were created by inserting a film, such as Teflon ®, into the desired laminate disbond areas. These methods, however, increase the thickness of the laminate, and in many instances the films are trapped in place and cannot be removed for testing of the laminate. Thus, previous test laminates, due to their increased thickness and the presence of artificial inserts, did not enable researchers to realistically model impact damage in composite laminates.

Accordingly, it is an object of this invention to produce a composite laminate which contains interlaminar disbonds of controlled sizes, shapes and positions within the structure.

A further object of this invention is to produce a composite laminate containing interlaminar disbonds which do not increase the thickness of the laminate.

Other objects and advantages of this invention will become apparent hereinafter in the specification which follows.

SUMMARY OF THE INVENTION

According to the present invention, the foregoing and additional objects are achieved by providing a composite layer to be later included within a laminate. The surfaces of this composite layer are then solvent cleaned and sandblasted, except in desired disbond areas, and the disbond areas are coated with a releasing interface, such as Frekote 33 (available from Dexter Hysol). A template to mask the bond areas is used to obtain disbond areas of controlled shapes or sizes. The resulting composite layer is then used in the subsequent manufacture of a laminate, whereby faulty adhesion in a laminate may be studied with prior knowledge of the size, shape and location of the disbond areas. Thus, a greater understanding of failure processes in composite structures is gained through use of the present invention.

DETAILED DESCRIPTION OF THE INVENTION

The present invention comprehends a process for producing composite laminates containing interlaminar disbond areas of controlled sizes, shapes and locations within a composite structure. The composite laminate is produced by first cutting a single ply of composite tape prepreg to the desired size. Prepreg tape, a commercially available product, is a term of art denoting pre-impregnated uni-directional continuous filament fiber materials that may be temperature cured to provide a rigid composite structure. The single ply of prepreg is placed between two plies of an effectively thermally-tolerant polymeric film, such as Kapton ®(available from E. I. DuPont de Nemours, Inc., Wilmington, Del.) which have been coated with a releasing interface. The single ply of composite tape prepreg is then processed through a nominal cure cycle using standard conditions of temperature, time and pressure. The resultant cured composite ply is separated from the polymeric film, solvent washed, and carefully abraded everywhere, except in the desired disbond areas, with a small hand-held, pencil-type sandblast unit. Light air pressure is used to avoid damage to the ply. A cardboard template is used to locate the smooth disbond areas which are then coated with a releasing interface, air dried for ten minutes, recoated, and dried for ten more minutes. Very beneficial results have been obtained by using Frekote 33, available from Dexter Hysol, as the releasing interface. The coated composite ply is heated in an air circulating oven to the maximum composite cure temperature and kept there for thirty minutes in order to bake on the releasing interface. The treated ply is then cooled and positioned in an uncured prepreg layup to duplicate faulty adhesion in a composite laminate structure.

According to the present invention, the location, size and shape of disbond areas in a test composite may be controlled. Hence this invention may be used to make composites for studying quality control and nondestructive evaluation procedures where the composites contain known flaw sites that are not caused by artificial inserts—thereby increasing laminate thickness—but are manufactured into the composite, which more nearly simulates actually observed conditions. Overall, the present invention promotes a better understanding of failure processes in composite structures.

What is claimed as new and desired to be secured by Letters Patent of the United States is:

1. A process for producing composite laminates containing interlaminar disbond areas of controlled sizes, shapes and positions within a composite structure without increasing the thickness of the laminate, which process comprises the steps of:

cutting a single ply of composite tape prepreg to a desired size;

placing the single ply of composite tape prepreg between two plies of polymeric film which have been coated with a releasing interface;

curing said single ply of composite tape prepreg;

separating the cured single ply of composite tape prepreg from said two plies of polymeric film;

washing said cured single ply of composite tape prepreg with a solvent;

sandblasting the desired bond areas of the cured single ply of composite tape prepreg and coating the desired disbond areas with a releasing interface;

heating the coated ply of cured composite tape prepreg to a composite cure temperature to bake on the releasing interface;

cooling the resulting ply of composite tape; and positioning the ply of composite tape between plies of an uncured prepreg layup where it is desired to duplicate faulty adhesion in a subsequently cured composite laminate structure;

whereby disbond areas are located anywhere in a composite laminate without altering laminate thickness, either in bond or disbond areas thereof.

* * * * *